US012460826B2

(12) United States Patent
Montanye

(10) Patent No.: US 12,460,826 B2
(45) Date of Patent: Nov. 4, 2025

(54) INTERLOCKING DUAL SIDE HINGE DOOR FOR A DOMESTIC KITCHEN APPLIANCE

(71) Applicants: BSH Home Appliances Corporation, Irvine, CA (US); BSH Hausgeräte GmbH, Munich (DE)

(72) Inventor: Phillip Montanye, New Bern, NC (US)

(73) Assignees: BSH Home Appliances Corporation, Irvine, CA (US); BSH Hausgeräte GmbH, Munich (DE)

( * ) Notice: Subject to any disclaimer, the term of this patent is extended or adjusted under 35 U.S.C. 154(b) by 400 days.

(21) Appl. No.: 18/085,620

(22) Filed: Dec. 21, 2022

(65) Prior Publication Data

US 2024/0210042 A1 Jun. 27, 2024

(51) Int. Cl.
*F24C 15/02* (2006.01)

(52) U.S. Cl.
CPC .................... *F24C 15/02* (2013.01)

(58) Field of Classification Search
CPC ........................................ F24C 15/02
USPC ........................................ 126/19 R
See application file for complete search history.

(56) References Cited

U.S. PATENT DOCUMENTS

| 2,815,018 | A | * | 12/1957 | Collins | F24C 15/02 |
| | | | | | 292/73 |
| 4,875,745 | A | * | 10/1989 | Trulaske | E05C 7/005 |
| | | | | | 312/109 |
| 9,510,696 | B2 | | 12/2016 | Lee | |
| 10,015,847 | B1 | | 7/2018 | Lavenziano | |
| 2009/0004455 | A1 | | 1/2009 | Gravagna et al. | |
| 2014/0097172 | A1 | * | 4/2014 | Kang | F24C 7/002 |
| | | | | | 219/394 |
| 2018/0142945 | A1 | | 5/2018 | Bodine | |
| 2023/0314005 | A1 | * | 10/2023 | Lai | F24C 15/322 |
| | | | | | 219/398 |

\* cited by examiner

*Primary Examiner* — Connor J Tremarche
(74) *Attorney, Agent, or Firm* — Michael E. Tschupp; Brando G. Braun; Andre Pallapies

(57) ABSTRACT

A domestic kitchen appliance includes: a housing; a first cooking chamber located in the housing; a second cooking chamber location in the housing; a heater configured to provide heat to one or both of the first cooking chamber and the second cooking chamber; a first door pivotably attached to the housing and configured to provide access to the first cooking chamber, the first door having an engagement member; and a second door pivotably attached to the housing and configured to provide access to the second cooking chamber, the second door having a receiver. The receiver is configured to receive the engagement member.

20 Claims, 4 Drawing Sheets

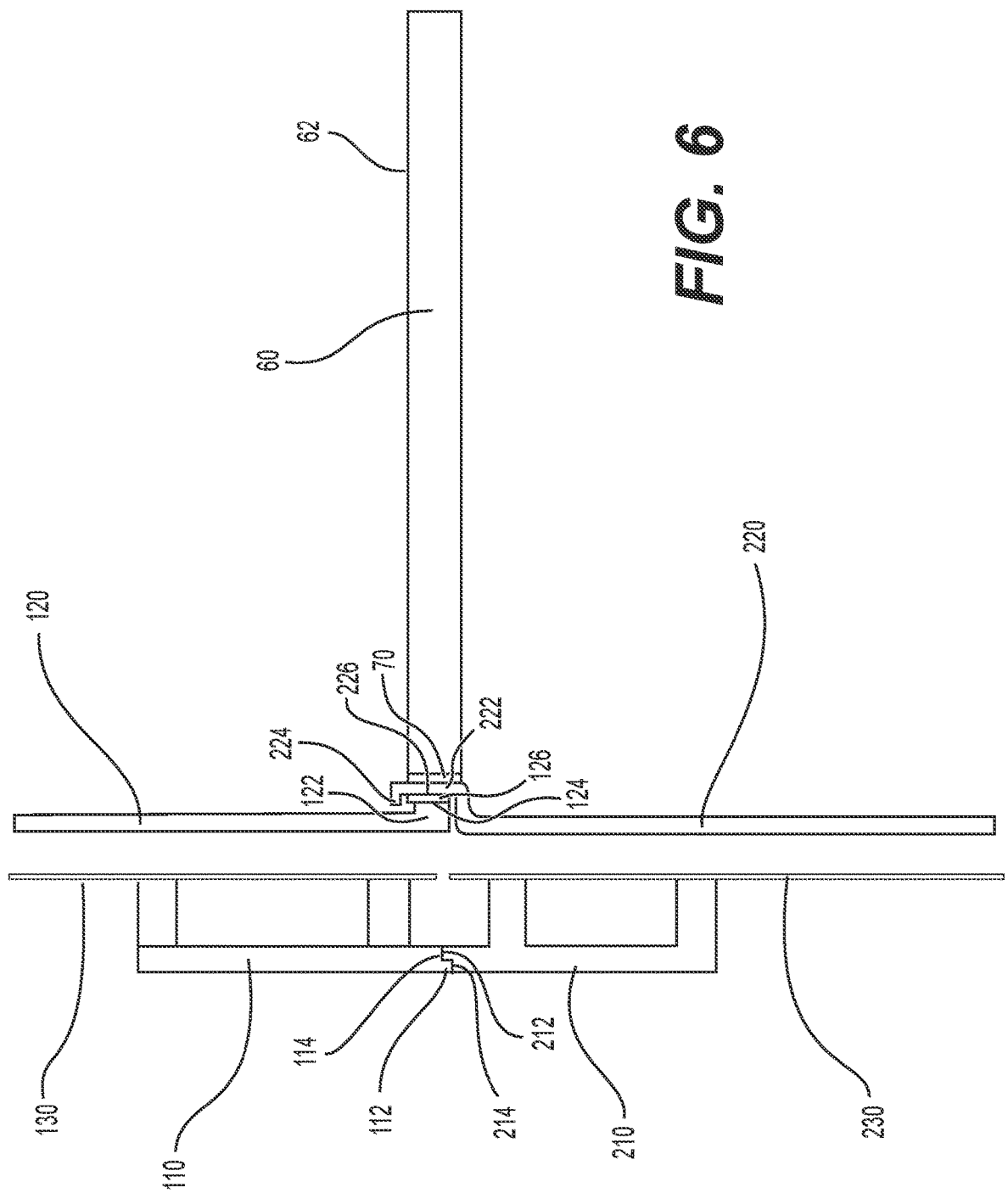

INTERLOCKING DUAL SIDE HINGE DOOR FOR A DOMESTIC KITCHEN APPLIANCE

FIELD OF THE INVENTION

The invention is directed to a domestic cooking appliance. More particularly, embodiments of the invention are directed to dual interlocking side hinge doors for a domestic cooking appliance.

An example of an application for the invention is a domestic kitchen cooking appliance in which a cooking chamber is accessible by dual interlocking side hinge doors.

BACKGROUND OF THE INVENTION

Some modern domestic kitchens include cooking appliances such as, for example, ranges, stoves, and ovens. Many of these cooking appliances have a cooking chamber that is configured to receive a food item to be cooked or otherwise heated. Some domestic kitchens have a plurality of cooking appliances to enable a user to cook and/or heat multiple food items at different temperatures.

Applicants recognized an improvement to the above arrangements and implement those improvements in embodiments of the invention.

SUMMARY

The invention achieves the benefit of allowing a user, with only using one hand, to access one or both cooking chambers of a cooking appliance having multiple cooking chambers where each cooking chamber has its own dedicated door.

Embodiments of the invention are based on the inventor's recognition that a user may sometimes want to open one cooking chamber of a multi-chamber cooking appliance while leaving the other cooking chamber(s) in a closed condition, and, at other times, simultaneously open two or more of the cooking chambers using only one hand. For example, in some situations the user has only one hand available to open the cooking chambers because the other of their hands is holding a food item or is otherwise unavailable.

Particular embodiments of the invention are directed to a domestic kitchen appliance having: a housing; a first cooking chamber located in the housing; a second cooking chamber location in the housing; a heater configured to provide heat to one or both of the first cooking chamber and the second cooking chamber; a first door pivotably attached to the housing and configured to provide access to the first cooking chamber, the first door having an engagement member; and a second door pivotably attached to the housing and configured to provide access to the second cooking chamber, the second door having a receiver. The receiver is configured to receive the engagement member, with the first door in a closed position and the second door in a closed position, moving the second door from the closed position to an open position causes the receiver to engage the engagement member and causes the first door to move from the closed position to an open position, and with the first door in the closed position and the second door in the closed position, moving the first door from the closed position to the open position causes the engagement member to move away from the receiver and allows the second door to remain in the closed position.

Some embodiments include a first door handle attached to the first door, and a second door handle attached to the second door. The receiver is located on the second door handle, and the engagement member is located on the first door handle.

Some embodiments include a second receiver, the second receiver being located on an inner door liner of the second door; and a second engagement member, the second engagement member being located on an inner door liner of the first door. The second receiver is configured to receive the second engagement member.

In some embodiments, with the first door in the closed position and the second door in the closed position, moving the second door from the closed position to the open position causes the second receiver to engage the second engagement member and causes the first door to move from the closed position to the open position, and with the first door in the closed position and the second door in the closed position, moving the first door from the closed position to the open position causes the second engagement member to move away from the second receiver and allows the second door to remain in the closed position.

Other embodiments of the invention are directed to a domestic kitchen appliance having: a housing; a first cooking chamber located in the housing; a second cooking chamber location in the housing; a heater configured to provide heat to one or both of the first cooking chamber and the second cooking chamber; a first door pivotably attached to the housing and configured to provide access to the first cooking chamber, the first door having an engagement member; a second door pivotably attached to the housing and configured to provide access to the second cooking chamber, the second door having a receiver; a first door handle attached to the first door; a second door handle attached to the second door; a second receiver located on an inner door liner of the second door; and a second engagement member located on an inner door liner of the first door. The receiver is located on the second door handle, the engagement member is located on the first door handle, the receiver is configured to receive the engagement member, and the second receiver is configured to receive the second engagement member.

BRIEF DESCRIPTION OF THE DRAWINGS

The following figures form part of the present specification and are included to further demonstrate certain aspects of the disclosed features and functions, and should not be used to limit or define the disclosed features and functions. Consequently, a more complete understanding of the exemplary embodiments and further features and advantages thereof may be acquired by referring to the following description taken in conjunction with the accompanying drawings, wherein:

FIG. 6 is a magnified partial vie of the sectional view of FIG. 5.

DETAILED DESCRIPTION

The invention is described herein with reference to the accompanying drawings in which exemplary embodiments of the invention are shown. The invention may, however, be embodied in many different forms and should not be construed as limited to the embodiments set forth herein.

As explained above, some modern domestic kitchens include cooking appliances such as, for example, ranges, stoves, and ovens. Many of these cooking appliances have a cooking chamber that is configured to receive a food item to be cooked or otherwise heated. Some domestic kitchens have a plurality of cooking appliances to enable a user to cook and/or heat multiple food items at different temperatures. Embodiments of the disclosure provide a domestic cooking appliance having two cooking chambers which each have their own dedicated door that is configured to close a respective one of the cooking chambers. In some situations, a user might want to open one cooking chamber of such a two-chamber cooking appliance while leaving the other cooking chamber in a closed condition. Other times, the user might want to simultaneously open both cooking chambers using only one hand. For example, in some situations the user has only one hand available to open the cooking chambers because the other of their hands is holding a food item or is otherwise unavailable. Examples of the invention will be described with reference to a multi-chamber cooking appliance having two cooking chambers. However, it is noted that the various aspects of the disclosure also apply to cooking appliances having three or more cooking chambers.

Figure 1:
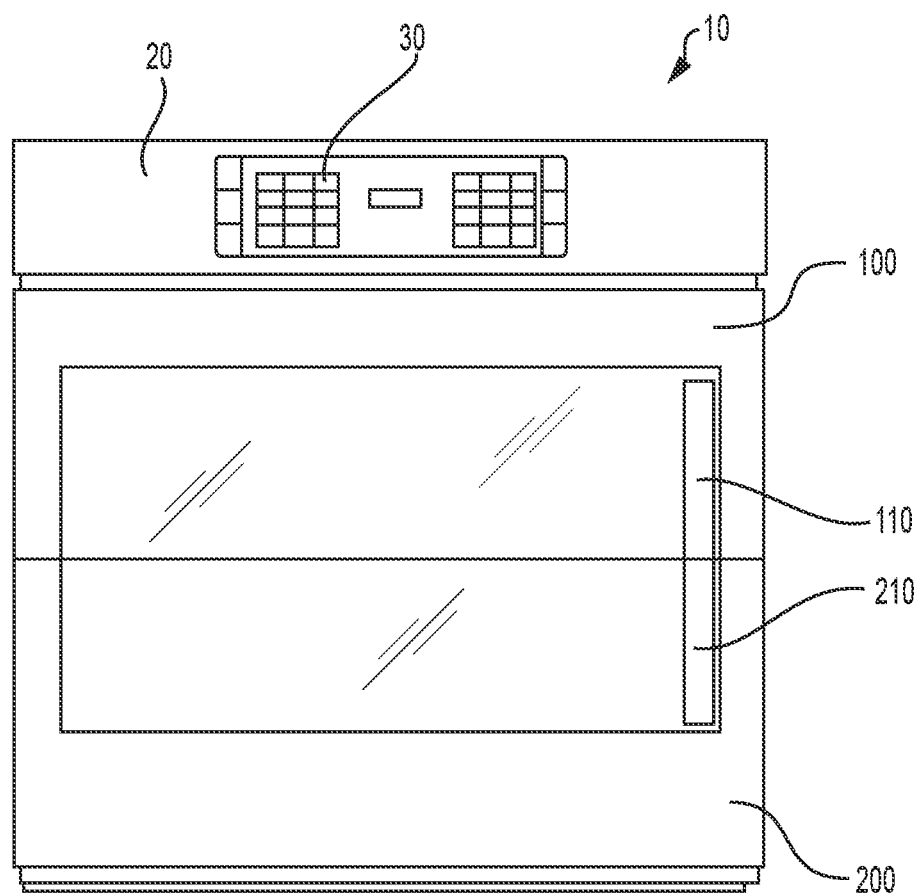
FIG. 1 is a front view of an exemplary appliance in accordance with embodiments of the invention.

FIG. 1 shows an example of a kitchen appliance 10, in this case an oven, in accordance with embodiments of the invention. Applicant notes that the figures are schematic in nature and are not drawn to scale. Various features are depicted larger relative to other features for clarity purposes even though their actual relative sizes are different. Kitchen appliance 10 includes an upper cooking chamber 40 and a lower cooking chamber 50 in which food items are heated and/or cooked. Upper cooking chamber 40 is accessed through a closable upper door 100. Lower cooking chamber 50 is accessed through a closable lower door 200. In this example, each of upper cooking chamber 40 and lower cooking chamber 50 has its own heating element (not shown) or a separate source of heat from a joint heating element such that the temperature inside upper cooking chamber 40 is controllable independent from the temperature inside lower cooking chamber 50. In some examples, each of the heating elements is one or more gas burners, one or more electric elements, one or more other types of elements that provide heat or heating energy to cooking chambers 40, 50, or any combination of these. A control panel 20 includes various controls 30 that allow a user of appliance 10 to control temperature, cook time, and other parameters of the cooking/heating operation of cooking chambers 40, 50, and other functions of appliance 10. In embodiments, upper cooking chamber 40 and lower cooking chamber 50 are independent cooking chambers which can be individually set with different temperatures, times, and other parameters. Because a user might have very different items in upper cooking chamber 40 and lower cooking chamber 50, it is desirable to be able to open one of the cooking chambers without having to open the other cooking chamber. Also, in other situations, the user might want to open both cooking chambers with one hand while holding a rack of food to be cooked in the other hand.

Figure 2:
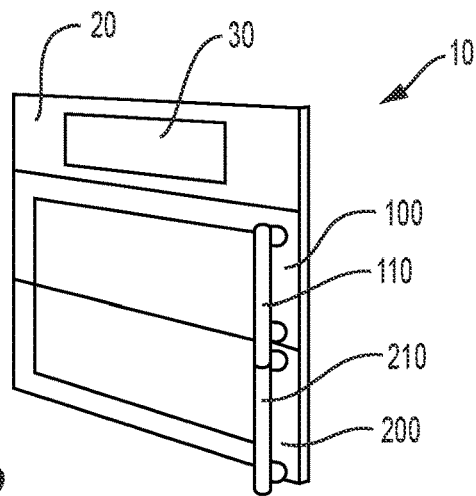
FIG. 2 is a perspective view of a door system in accordance with exemplary embodiments of the invention with both doors in a closed position.
Figure 3:
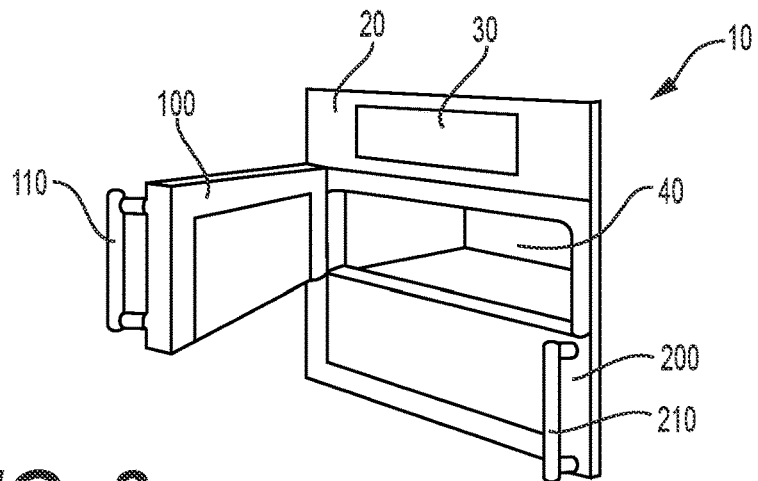
FIG. 3 is a perspective view of the door system of FIG. 2 with a top door in an open position and a bottom door in the closed position.
Figure 4:
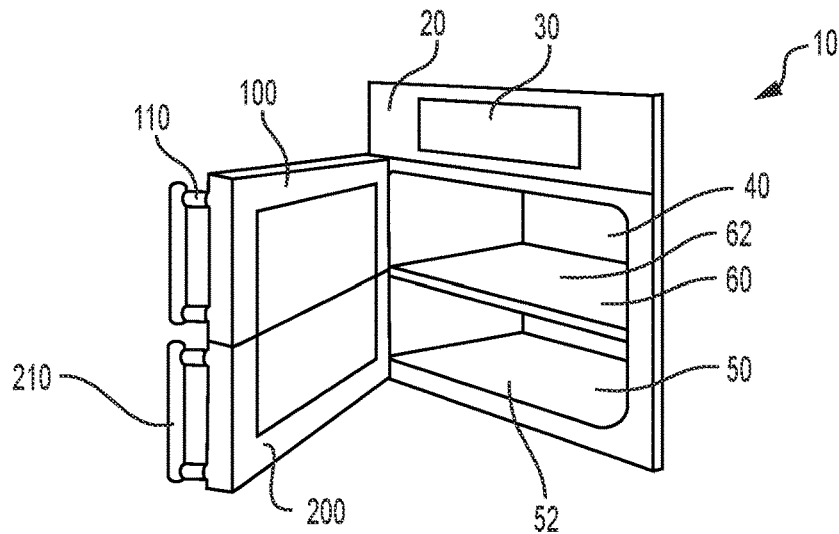
FIG. 4 is a perspective view of the door system of FIG. 2 with both doors in an open position.

FIG. 1 shows upper door 100 having an upper handle 110, and lower door 200 having a lower handle 210. Upper handle 110 is configured to be grasped by a user to open and close upper door 100. Lower handle 210 is configured to be grasped by a user to open and close lower door 200. FIG. 2 shows appliance 10 in a state where both upper door 100 and lower door 200 are in closed positions. FIG. 3 shows appliance 10 in a state where upper door 100 is in an open position and lower door 200 is in the closed position. FIG. 4 shows appliance 10 in a state where both upper door 100 and lower door 200 are in open positions. FIG. 3 shows a chamber separator 60 that separates upper cooking chamber 40 from lower cooking chamber 50. In embodiments, chamber separator 60 is thermally insulated to reduce heat generated in either or both of upper cooking chamber 40 and lower cooking chamber 50 from being transferred to the other cooking chamber 40, 50.

In this example, chamber separator 60 is configured as a shelf. One or more items to be cooked/heated in upper cooking chamber 40 can be placed on a surface 62 of chamber separator 60 or can be placed on racks or other support devices (not shown) in upper cooking chamber 40. Similarly, one or more items to be cooked/heated in lower cooking chamber 50 can be placed on a surface 52 of lower cooking chamber 50 or can be placed on racks or other support devices (not shown) in lower cooking chamber 50. For example, in embodiments, one or both of upper cooking chamber 40 and lower cooking chamber 50 has slots, supports, bars, or other structure in sidewalls of the respective cooking chamber 40, 50 that supports racks, shelves, and/or other support devices.

Figure 5:
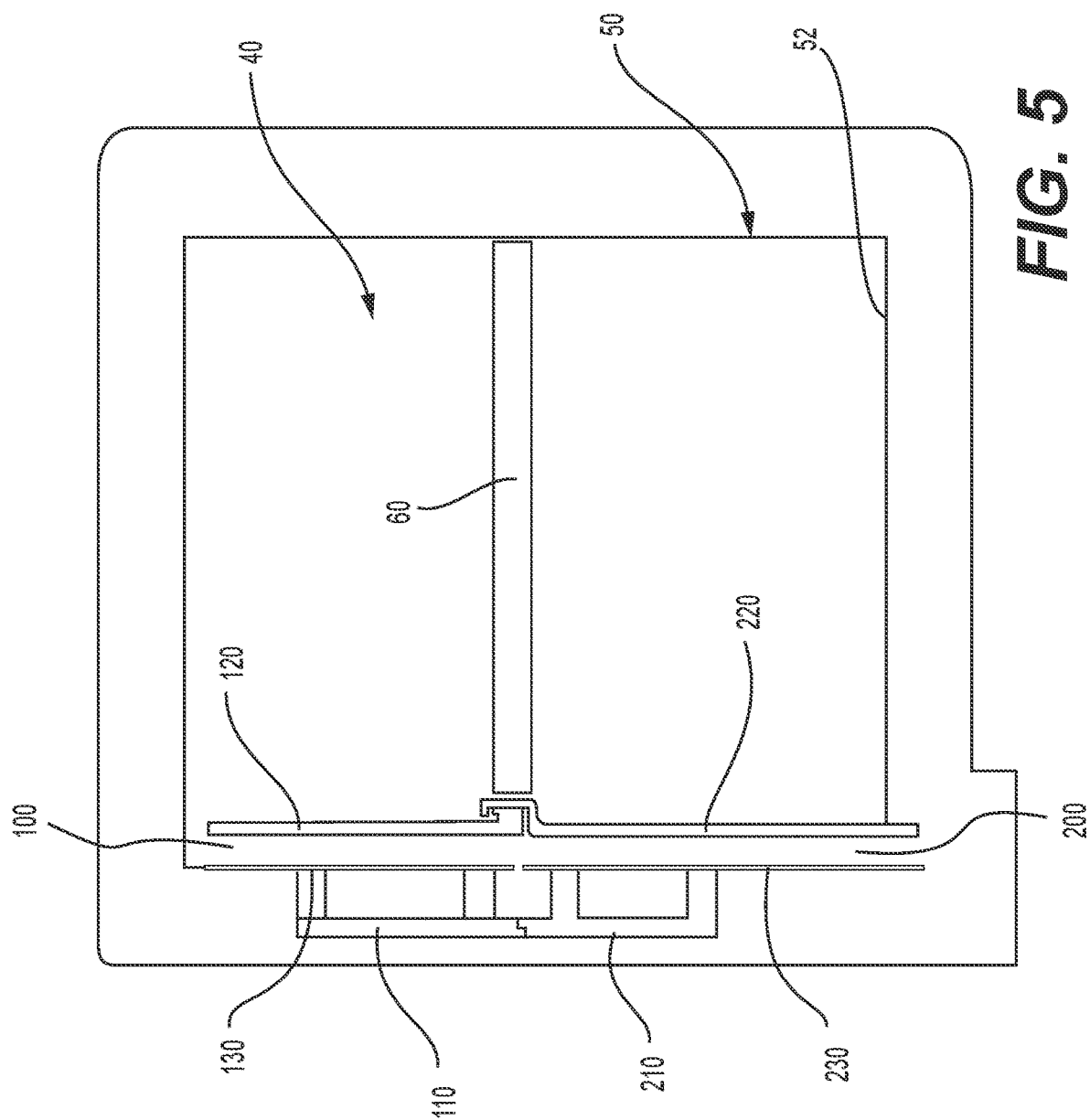
FIG. 5 is a side sectional view of the appliance of FIG. 1 with the doors in a closed position.

FIG. 5 shows a cross-sectional view of appliance 10 with both upper door 100 and lower door 200 in the closed position. In this example, upper door 100 has an upper door outer skin 130 and an upper door inner liner 120. In some embodiments, upper door outer skin 130 is separated from upper door inner liner 120 by an air space that helps reduce heat transfer from upper door inner liner 120 to upper door outer skin 130. In some embodiments, a foam or other temperature insulating material is used in conjunction with the air space to further insulate upper door outer skin 130 from heat generated in upper cooking chamber 40. In this example, lower door 200 has an lower door outer skin 230 and an lower door inner liner 220. In some embodiments, lower door outer skin 230 is separated from lower door inner liner 220 by an air space that helps reduce heat transfer from lower door inner liner 220 to lower door outer skin 230. In some embodiments, a foam or other temperature insulating material is used in conjunction with the air space to further insulate lower door outer skin 230 from heat generated in lower cooking chamber 50.

Embodiments provide the advantage of allowing the user to simultaneously open both upper door 100 and lower door 200 using only one hand. As shown in FIG. 5, this feature is provided by a hooking mechanism on lower door 200 that hooks upper door 100 when lower door 200 is opened, and by an engagement mechanism on lower handle 210 that engages upper handle 110 when lower door 200 is opened (as shown in FIG. 4). This feature also allows the user to open only upper door 100 to access upper cooking chamber 40, while leaving lower door 200 (and thus lower cooking chamber 50) closed (as shown in FIG. 3).

FIG. 6 shows a magnified view of a portion of FIG. 5. As shown in FIG. 6, upper handle 110 and lower handle 210 have an engagement feature where they contact each other.

This engagement feature transfers opening force exerted by the user on lower handle 210 to upper handle 110 such that opening lower door 200 will result in upper door 100 also being opened. In this example, upper handle 110 has an upper handle catch 112 that is configured as a protrusion that extends from a bottom end of upper handle 110. Upper handle 110 has an upper handle recess 114 that is laterally adjacent to upper handle catch 112. In this example, lower handle 210 has a lower handle catch 212 that is configured as a protrusion that extends from a top end of lower handle 210. Lower handle 210 has a lower handle recess 214 that is laterally adjacent to lower handle catch 212. As shown in FIG. 6, lower handle catch 212 is received in upper handle recess 114 when both doors are in the closed position. Similarly, upper handle catch 112 is received in lower handle recess 214 when both doors are in the closed position shown in FIGS. 2, 5 and 6).

With both doors in the closed position shown in FIG. 2, when a user pulls on upper handle 110, upper handle catch 112 is moved away from lower handle catch 212 and no opening force is transferred from upper handle 110 to lower handle 210. As a result, upper door 100 opens and lower door 200 remains closed (as shown in FIG. 3). In this state, the user can pull on lower handle 210 to open lower door 200 independently from upper door 100.

With both doors in the closed position shown in FIG. 2, when a user pulls on lower handle 210, lower handle catch 212 engages upper handle catch 112 and transfers opening force from lower handle 210 to upper handle 110. As a result, both upper door 100 and lower door 200 open (as shown in FIG. 4). In this state, the user can close lower door 200 independently from upper door 100 by pushing on lower handle 210.

In addition to the engagement feature of upper handle 110 and lower handle 210, embodiments include an engagement feature between upper door 100 and lower door 200. As shown in FIG. 6, in this example, upper door inner liner 120 and lower door inner liner 220 have an engagement feature where they contact each other. This engagement feature transfers opening force exerted by the user on lower handle 210 through lower door inner liner 220 to upper door inner liner 120 such that opening lower door 200 will result in upper door 100 also being opened. In this example, upper door inner liner 120 has an extension 122 that extends inwardly toward the cooking chambers. Extension 122 has a surface 124 at the most inward end of extension 122. In this example, a pad 126 is located on the surface 124 to provide a buffer between extension 122 and a corresponding portion of lower door inner liner 220. In some embodiments, pad 126 is a temperature resistant resilient material. In the example shown in FIG. 6, lower door inner liner 220 has an engagement feature that is, in this example, a hook 222 located at an upper end of lower door inner liner 220. In this example, hook 222 has a protrusion 224 at its end that can help guide extension 122 of upper door inner liner 120 into contact with hook 222. Hook 222 has a surface 226 that is configured to receive pad 126 (or surface 124, if no pad is used). In the example shown in FIG. 6, extension 122 is received in hook 222 when both doors are in the closed position shown in FIGS. 2, 5 and 6.

In addition to the interaction between lower handle catch 212 and upper handle catch 112 described above, with both doors in the closed position shown in FIG. 2, when a user pulls on upper handle 110, extension 122 of upper door inner liner 120 is moved away from hook 222 of lower door inner liner 220 and no opening force is transferred from upper door inner liner 120 to lower door inner liner 220. As a result, upper door 100 opens and lower door 200 remains closed (as shown in FIG. 3). In this state, the user can pull on lower handle 210 to open lower door 200 independently from upper door 100.

In addition to the interaction between lower handle catch 212 and upper handle catch 112 described above, with both doors in the closed position shown in FIG. 2, when a user pulls on lower handle 210, hook 222 engages extension 122 and transfers opening force from lower door inner liner 220 to upper door inner liner 120. As a result, both upper door 100 and lower door 200 open (as shown in FIG. 4). In this state, the user can close lower door 200 independently from upper door 100 by pushing on lower handle 210.

As mentioned above, upper cooking compartment 40 and lower cooking compartment 50 can be operated independently such that the temperature inside the two cooking compartments can differ greatly from each other. In addition, it is preferable to reduce or eliminate temperature transfer from chamber separator 60 to doors 100, 200. As a result, embodiments include a heat resistant seal 70 located on the end of chamber separator 60. Heat resistant seal 70 provides thermal insulation between chamber separator 60 and, in this example, hook 222. Heat resistant seal 70 also provides a vapor/gas proof seal between upper cooking chamber 40 and lower cooking chamber 50. Heat resistant seal 70 is, in embodiments, a material that can withstand temperatures used in pyrolytic (self-cleaning) ovens, which can be approximately 800 degree F.

In embodiments, chamber separator 60 is fixed in place and is not easily removable. In other embodiments, chamber separator 60 is easily removable by the user so that upper cooking chamber 40 and lower cooking chamber 50 are combined to form one larger cooking chamber.

While embodiments of the invention have been described with the lower door engaging the upper door such that the upper door is opened when the lower door is opened, other embodiments are configured such that the upper door engages the lower door such that the lower door is opened when the upper door is opened. In embodiments, this is achieved by reversing the engagement features of the doors and inner liners.

It will be appreciated that variants of the above-disclosed and other features and functions, or alternatives thereof, may be combined into many other different systems or applications. Any of the features described above can be combined with any other feature described above as long as the combined features are not mutually exclusive. Various presently unforeseen or unanticipated alternatives, modifications, variations or improvements therein may be subsequently made by those skilled in the art which are also intended to be encompassed by the invention.

What is claimed is:

1. A domestic kitchen appliance, comprising:
    a housing;
    a first cooking chamber located in the housing;
    a second cooking chamber location in the housing;
    a heater configured to provide heat to one or both of the first cooking chamber and the second cooking chamber;
    a first door pivotably attached to the housing and configured to provide access to the first cooking chamber, the first door having an engagement member that is positionally fixed to the first door such that the engagement member cannot move relative to the first door; and
    a second door pivotably attached to the housing and configured to provide access to the second cooking chamber, the second door having a receiver that is positionally fixed to the second door such that the receiver cannot move relative to the second door;

wherein the receiver is configured to receive the engagement member, with the first door in a closed position and the second door in a closed position, moving the second door from the closed position to an open position causes the receiver to engage the engagement member and causes the first door to move from the closed position to an open position, and with the first door in the closed position and the second door in the closed position, moving the first door from the closed position to the open position causes the engagement member to move away from the receiver and allows the second door to remain in the closed position.

2. The domestic kitchen appliance of claim 1, wherein the first door is an upper door, and the second door is a lower door positioned below the upper door, and a pivoting axis of the first door and a pivoting axis of the second door are coaxial.

3. The domestic kitchen appliance of claim 1, wherein the first door is a lower door, and the second door is an upper door positioned above the lower door, and a pivoting axis of the first door and a pivoting axis of the second door are coaxial.

4. The domestic kitchen appliance of claim 1, further comprising a chamber separator that physically separates the first cooking chamber from the second cooking chamber.

5. The domestic kitchen appliance of claim 4, wherein the chamber separator provides a thermal barrier between the first cooking chamber and the second cooking chamber.

6. The domestic kitchen appliance of claim 5, wherein the chamber separator is a shelf.

7. The domestic kitchen appliance of claim 1, wherein the receiver is located on an inner liner of the second door, and the engagement member is located on an inner liner of the first door.

8. The domestic kitchen appliance of claim 1, further comprising a first door handle attached to the first door, and a second door handle attached to the second door, wherein the receiver is located on the second door handle, and the engagement member is located on the first door handle.

9. The domestic kitchen appliance of claim 8, further comprising a second receiver, the second receiver being located on an inner door liner of the second door; and a second engagement member, the second engagement member being located on an inner door liner of the first door, wherein the second receiver is configured to receive the second engagement member.

10. The domestic kitchen appliance of claim 9, wherein with the first door in the closed position and the second door in the closed position, moving the second door from the closed position to the open position causes the second receiver to engage the second engagement member and causes the first door to move from the closed position to the open position, and with the first door in the closed position and the second door in the closed position, moving the first door from the closed position to the open position causes the second engagement member to move away from the second receiver and allows the second door to remain in the closed position.

11. The domestic kitchen appliance of claim 10, wherein with the first door in the open position and the second door in the open position, moving the second door from the open position to the closed position causes the receiver to move away from the engagement member and allows the second door to move from the open position to the closed position while the first door remains in the open position.

12. The domestic kitchen appliance of claim 11, wherein with the first door in the open position and the second door in the open position, moving the first door from the open position to the closed position causes the engagement member to engage the receiver and cause the second door to move from the open position to the closed position.

13. The domestic kitchen appliance of claim 1, wherein with the first door in the open position and the second door in the open position, moving the second door from the open position to the closed position causes the receiver to move away from the engagement member and allows the second door to move from the open position to the closed position while the first door remains in the open position.

14. The domestic kitchen appliance of claim 13, wherein the receiver is located on an inner door liner of the second door, and the engagement member is located on an inner door liner of the first door.

15. The domestic kitchen appliance of claim 1, wherein the receiver is located on an inner door liner of the second door, and the engagement member is located on an inner door liner of the first door.

16. A domestic kitchen appliance, comprising:

a housing;

a first cooking chamber located in the housing;

a second cooking chamber location in the housing;

a heater configured to provide heat to one or both of the first cooking chamber and the second cooking chamber;

a first door pivotably attached to the housing and configured to provide access to the first cooking chamber, the first door having an engagement member that is positionally fixed to the first door such that the engagement member cannot move relative to the first door;

a second door pivotably attached to the housing and configured to provide access to the second cooking chamber, the second door having a receiver that is positionally fixed to the second door such that the receiver cannot move relative to the second door;

a first door handle attached to the first door;

a second door handle attached to the second door;

a second receiver located on an inner door liner of the second door; and a second engagement member located on an inner door liner of the first door, wherein the receiver is located on the second door handle, the engagement member is located on the first door handle, the receiver is configured to receive the engagement member, and the second receiver is configured to receive the second engagement member.

17. The domestic kitchen appliance of claim 16, wherein with the first door in a closed position and the second door in a closed position, moving the second door from the closed position to an open position causes the receiver to engage the engagement member and causes the first door to move from the closed position to an open position, and with the first door in the closed position and the second door in the closed position, moving the first door from the closed position to the open position causes the engagement member to move away from the receiver and allows the second door to remain in the closed position.

18. The domestic kitchen appliance of claim 17, wherein with the first door in the closed position and the second door in the closed position, moving the second door from the closed position to the open position causes the second receiver to engage the second engagement member and causes the first door to move from the closed position to the open position, and with the first door in the closed position and the second door in the closed position, moving the first door from the closed position to the open position causes the second engagement member to move away from the second receiver and allows the second door to remain in the closed position.

19. The domestic kitchen appliance of claim 16, further comprising a chamber separator that physically separates the first cooking chamber from the second cooking chamber.

20. The domestic kitchen appliance of claim 19, wherein the chamber separator provides a thermal barrier between the first cooking chamber and the second cooking chamber.

* * * * *